Nov. 13, 1934.　　R. P. GLENN　　1,980,858
ROTARY STEAM ENGINE
Filed Sept. 11, 1933　　4 Sheets-Sheet 1
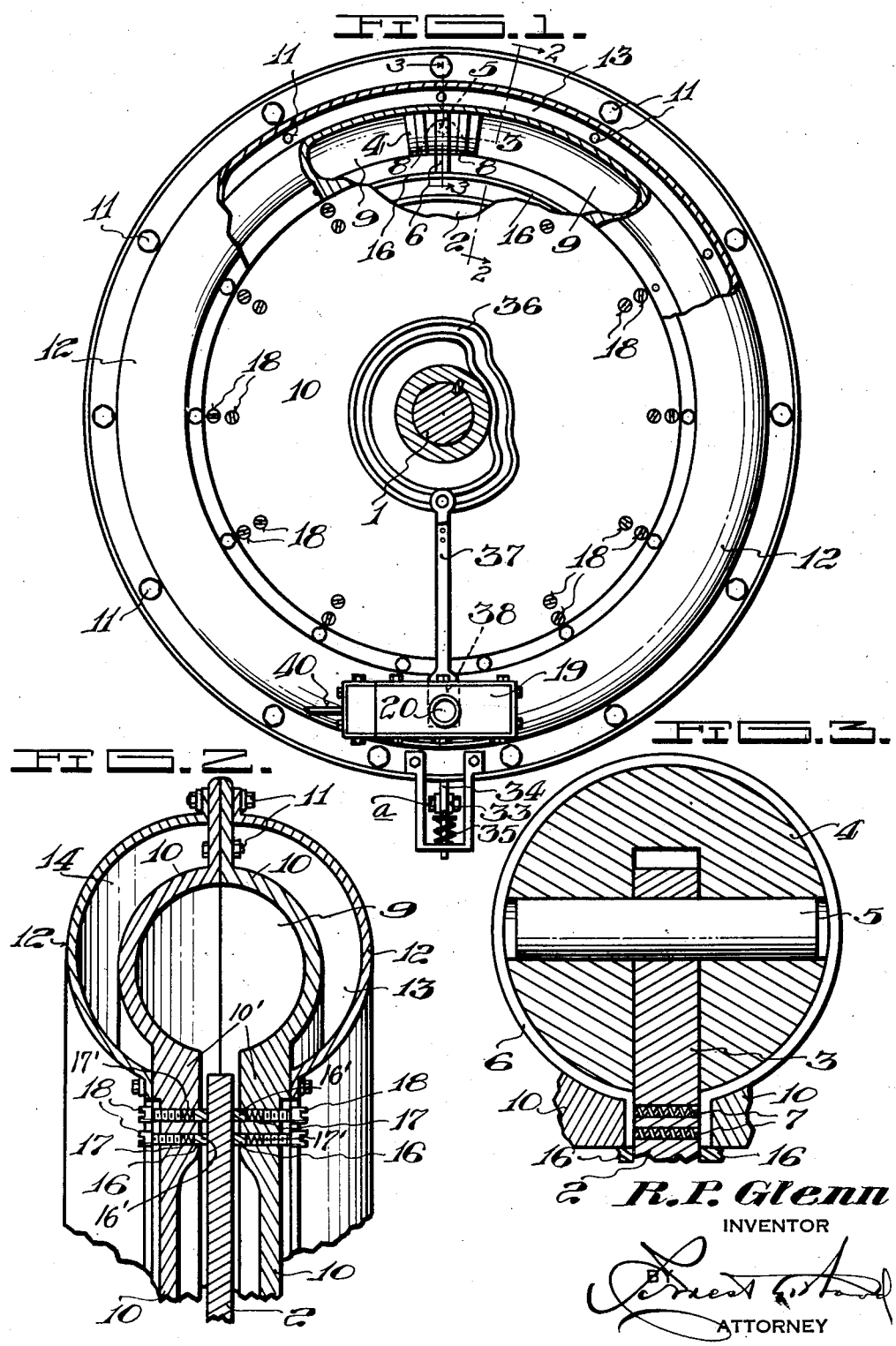
R. P. Glenn
INVENTOR
ATTORNEY

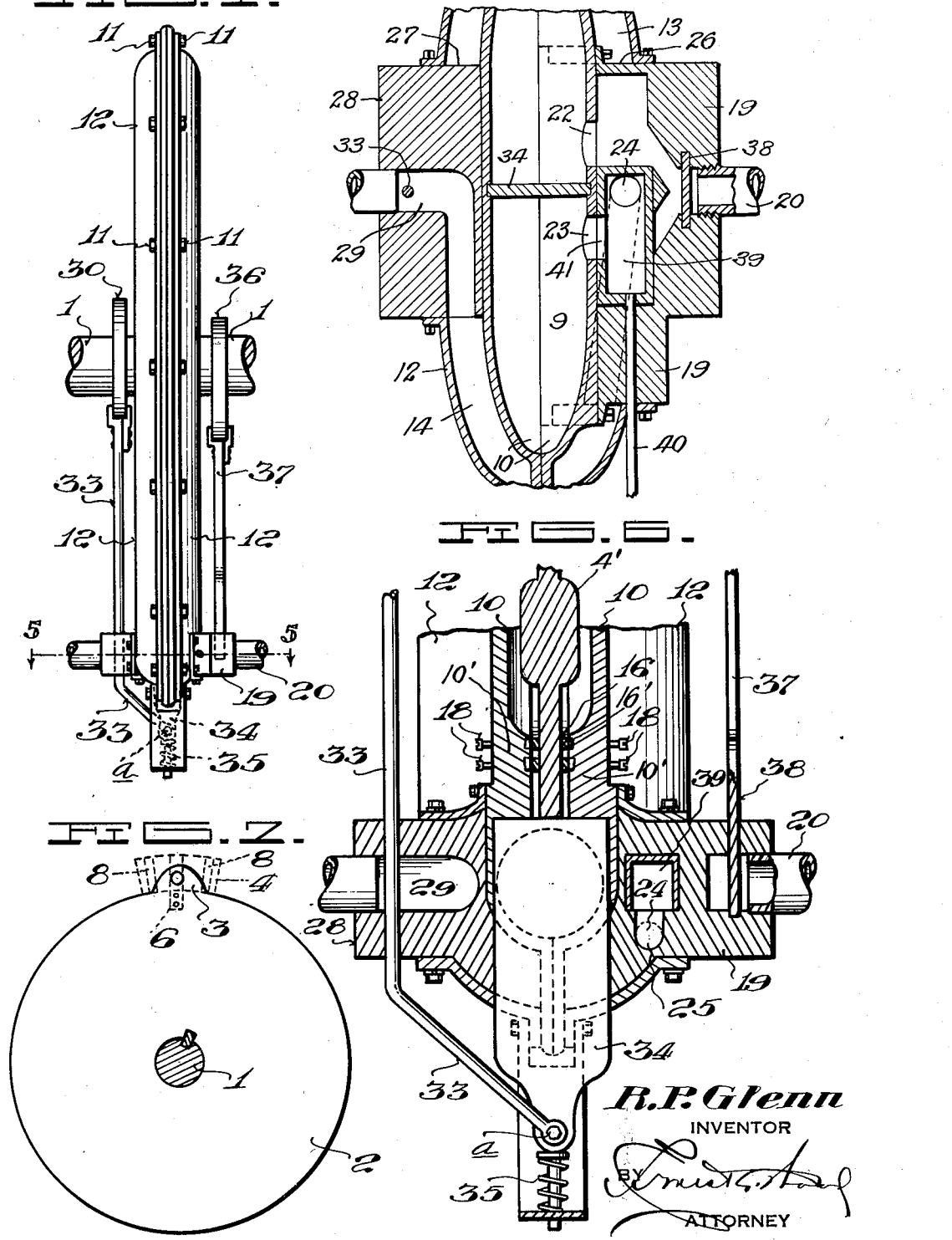

Nov. 13, 1934.  R. P. GLENN  1,980,858
ROTARY STEAM ENGINE
Filed Sept. 11, 1933  4 Sheets-Sheet 3
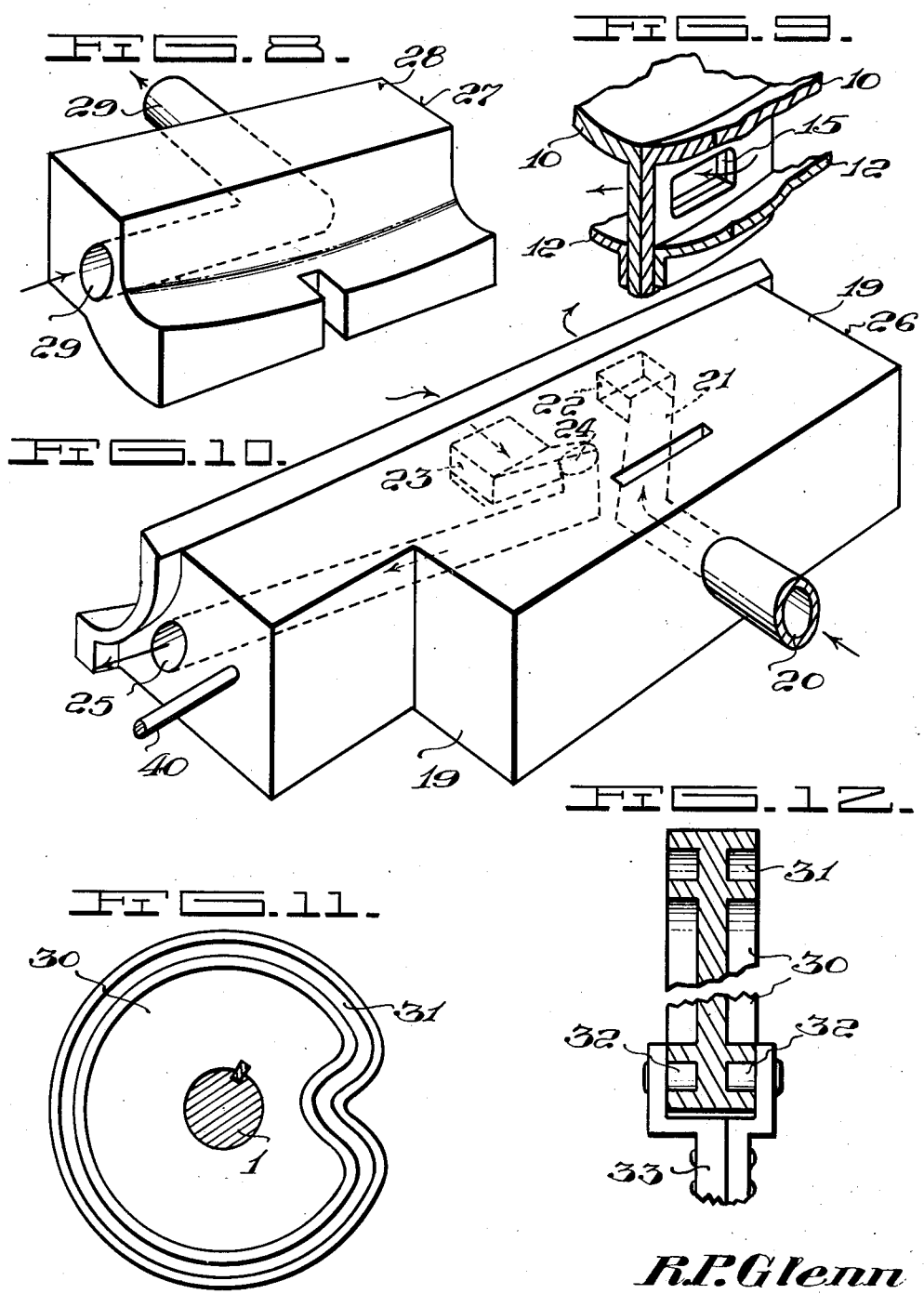
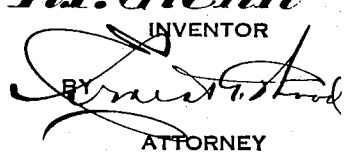
R.P.Glenn
INVENTOR
ATTORNEY

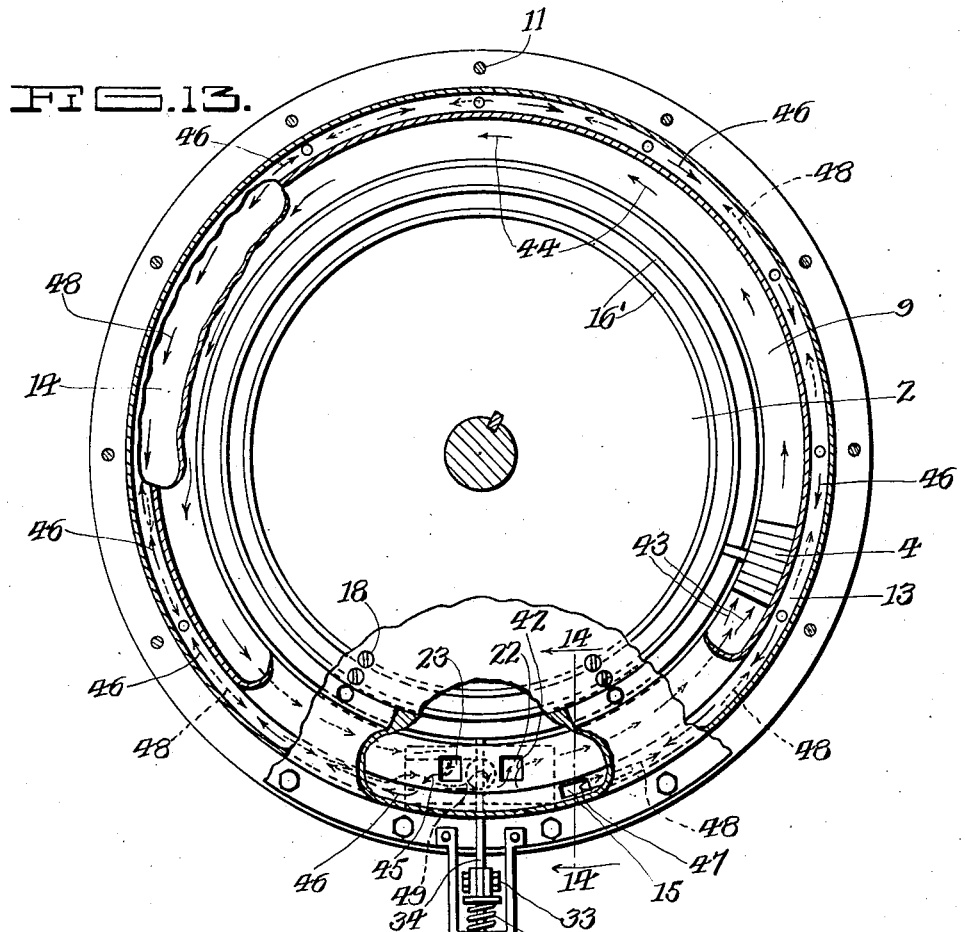
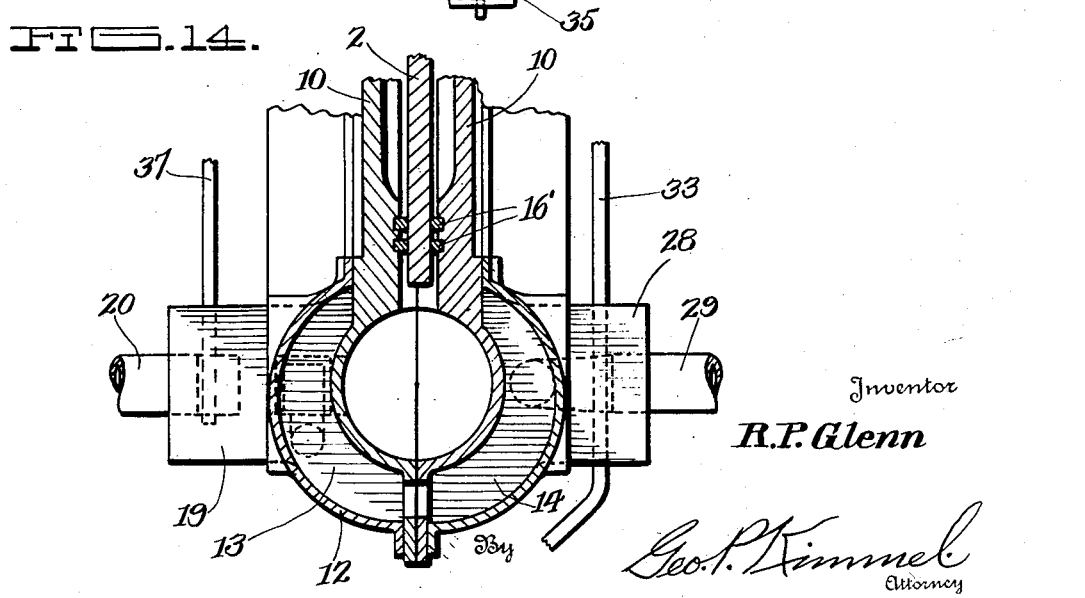

Patented Nov. 13, 1934

1,980,858

UNITED STATES PATENT OFFICE 1,980,858

ROTARY STEAM ENGINE

Russell P. Glenn, Abilene, Tex.

Application September 11, 1933, Serial No. 688,963

5 Claims. (Cl. 121—76)

This invention relates to engines and it has particular reference to a steam engine of the rotary type.

The principal object of the invention is to provide, in an engine of the type specified an improved combination of elements so constructed and arranged as to obtain greatly increased efficiency over the conventional types of steam engines by reason of the fact that means are so provided as to allow an unusually long expansion period for the steam relative to the period during which the piston is exposed to full boiler pressure, and to reduce the escape of heat as such from the expanding steam.

Another object of the invention is to provide an engine wherein the mass of the reciprocating parts is reduced to a minimum.

Another object of the invention is the provision of novel means for jacketing the expansion cylinder whereby a very large percentage of the B. t. u. value of the steam supplied to the engine is extracted and turned into useful work.

Another object of the invention is the provision of an engine having many of the advantages of a steam turbine but which, when so required, will operate economically at relatively low speeds, thereby avoiding the necessity of high gear reduction and highly accurate bearings.

Another object of the invention is the provision of a structure capable of being readily assembled and disassembled when the occasion so requires.

Still another object of the invention is the provision of a simple valve mechanism by means of which the engine may be reversed.

With the foregoing objects as paramount, the invention has particular reference to its salient features of construction and arrangement of parts which will become manifest as the description proceeds, taken in connection with the accompanying drawings, wherein:

Figure 1 is a side elevational view with portions broken away.

Figure 2 is a fragmentary cross sectional view of the expansion chamber and outer jackets taken along the line 2—2 of Figure 1.

Figure 3 is a view in cross section of the piston taken along the line 3—3 of Figure 1.

Figure 4 is an edge elevation of the device shown in Figure 1.

Figure 5 is a fragmentary view taken on the line 5—5 of Figure 4.

Figure 6 is a fragmentary view taken on the line 6—6 of Figure 5.

Figure 7 is a side elevation of the rotor.

Figure 8 is a detail view of the exhaust port.

Figure 9 is a fragmentary view of the divided steam jacket showing the steam port between the two chambers.

Figure 10 is a detail view of the steam inlet.

Figure 11 is an elevational view of one of the cam rings, and

Figure 12 is a fragmentary view in cross section of one of the cam rings.

Figure 13 is an intake side elevation with parts broken away showing the movement of steam through the engine.

Figure 14 is a sectional view taken along the line 14—14 of Figure 13.

Continuing more in detail with the drawings, 1 denotes a central shaft to which a rotor 2 is keyed. As shown in Figure 7 the rotor 2 is provided with a projection 3 on its periphery which serves to support a piston 4 through the medium of a wrist pin 5, shown best in Figure 3. The piston 4 is provided with a central piston ring 6, which is formed so that its ends define ears which are urged outwardly by springs 7 reposing in apertures in the rotor 2. The companion rings 8, also carried by the piston 4 are circular. These rings, like the central ring 6, are made wider than the ports in the chamber 9, to be hereinafter described, in order that these rings may freely pass these ports.

The expansion cylinder or chamber 9 is defined by the separable walls 10 secured together by means of bolts 11. The chamber 9 is housed by the jacket 12 which is divided into chambers 13 and 14 which are in communication by reason of the opening 15 shown in Figure 9, a fragmentary view.

The walls 10 extend radially inwardly from the cylinder in substantially parallel spaced relation to each other to form a housing for the rotor 2. Just inwardly from the cylinder, each wall 10 is provided with a thickened annular portion 10' extending toward the opposite wall 10. These thickened annular portions 10', as shown in Figure 2, are each provided with a pair of concentric grooves 16 for the reception of the annular compression rings 16'. Leading from the bottom of each groove to the outer surface of the wall 10 is a series of holes 17 adapted to receive compression springs 17' and interiorly threaded for a portion of their length to receive the screws 18. The screws 18 are adjustable to press the springs 17' against the compression rings 16', and to cause these rings to be at all times pressed against the sides of the rotor with the proper tension. The purpose of these rings is to seal the inner chamber 9 against leakage inwardly past the sides of the rotor 2.

From the foregoing it is obvious that the principal elements of the structure, namely the rotor 2 and piston 4 move in a circular path, thereby eliminating to a considerable degree the vibration inherent in reciprocating and other similar type engines. As a further means of preventing vibration, rotor 2 may have a counterbalancing weight 4' opposite the piston 4, or there may be an appropriate arrangement of pistons for this purpose with corresponding change in cams.

A steam chest 19, shown in detail in Figure 10 is affixed to one side of the jacket 12. Steam enters the steam chest 19 through an inlet pipe 20, and passes through a passage 21 after which it enters the chamber 9 through a port 22, as shown by the arrows 42 in Figure 13. See Figures 5 and 10. The piston 4 and rotor 2 are actuated by steam pressure thus entering the chamber 9 and impinging against the piston as shown by the arrows 43 in Figure 13. The steam which has expanded to force the piston around through one cycle is ahead of the piston on the next cycle and is pushed around by the piston along the line indicated by the arrows 44 in Figure 13.

After completing the cycle the steam again enters the steam chest 19 through port 23 as indicated by the arrows 45 and passes downwardly through port 24 and emerges into the jacket chamber 13 through passage 25 at approximately the position of the arrows 46 in Figure 13. See also Figures 5 and 6.

Referring again to Figure 13 and also to Figures 8, 9 and 10, the steam entering the jacket chamber 13 from the passage 25 makes a complete cycle in this chamber in a clockwise direction along the path indicated by the arrows 46, and is deflected by the wall 26 of the steam chest (see Figure 5) into the companion jacket chamber 14 through the port 15 as indicated by the arrow 47 in Figure 13. After passing through port 15 the steam strikes the face 27 of the block 28, reversing the direction of travel of the steam. The steam then makes a complete cycle in a counterclockwise direction in the jacket chamber 14 as shown by the arrows 48 in Figure 13, and emerges through passage 29 in the block 28 as shown by the dotted arrow 49.

Keyed to the shaft 1 is a cam ring 30 which is shaped as shown in Figures 11 and 12. The groove 31 in the cam ring 30 receives opposing rollers 32 carried by the upper end of an arm 33. The arm is guided by reason of its passage through the exhaust block 28 (see Figures 5 and 6) and to its lower end is connected at "a" a partition 34. The partition 34 is slidably moved into and out of the inner chamber 9 as apparent in Figures 5 and 6 by virtue of the peculiar shape of the cam 30 and the relationship of the connecting rod 33 therewith. To insure complete closing of the chamber passage 9 by the partition 34, a spring 35 normally urges the plate upward.

The cam ring 30 is so synchronized with the piston 4 that the partition will be moved from the cylinder passage precisely at the time the piston reaches this point, thereby allowing the piston to continue in its travel around the cylinder. After the piston has passed this point the partition 34 is moved upward by the cam 30 thereby again closing the inner chamber 9 in back of the piston 4.

On the opposite side of the rotor and also keyed to the shaft 1 is another cam ring 36 shown in Figures 1 and 4. Connected to the cam ring 36 is an arm 37 having roller engagement with the cam similar to the showing in Figure 12. To the lower end of this arm is connected a steam cut off plate 38, which due to the shape of the cam 36 is moved into and out of the steam inlet 20. This cam is preferably designed so that the passage 20 is closed by the plate 38 approximately two thirds of the time required for the piston to make one revolution. The cam 36 is so synchronized with the piston 4 that the plate 38 is raised as the piston passes the port 22, thereby allowing the full head of steam to act on the piston for approximately one third of a revolution, after which the plate 38 closes and the steam expands within the chamber 9 behind the piston 4. Obviously the cam 36 could be so designed that the piston would be exposed to the full head of steam for any relative length of time desired, for the purpose of obtaining more or less power without regard to economy.

Referring to Figure 5 a reversing mechanism is shown comprising a rectangular chamber 39 which is slidable lengthwise within the steam chest 19 as in Figures 5 and 6 by means of a rod 40. This rod 40 may be operated manually or in any other suitable manner. The position of the chamber 39 in Figure 5 is the normal position, but it may be moved so that the port 41 therein is in register with the port 22, allowing the incoming steam to pass from the passage 20 into the chamber 9 through the port 23. After making one complete cycle, the steam emerges from the chamber 9 through ports 22, 41 and opening 24 into the jacket chamber 13. The steam makes one complete revolution in this chamber and then is deflected into the companion jacket chamber 14 through port 15, and being deflected by the wall 27 of block 28 the steam reverses its direction of travel in the chamber 14 and is finally discharged through port 29 back to the boiler or to any other point desired.

From the above it will be apparent that by virtue of the jacket surrounding substantially the entire length of the cylinder, heat loss from the steam actually performing useful work within the cylinder will be reduced to a minimum. Thus any heat wasted is wasted from the low grade heat of the exhaust steam instead of from the high grade heat of the steam in the cylinder. This permits a greater portion of the B. t. u. of the steam taken into the engine to be turned into useful work. It is also noted that the exhaust steam passes in one direction around one side of the cylinder until it comes in contact with the block 19 at which point it is reversed and passes back around on the other side of the cylinder in the other direction. This puts the hottest portion of the exhaust steam in contact with the same end of the cylinder as the coldest portion, and makes the average heat of exhaust steam in the jacket at any one point in the length of the cylinder substantially the same as that of any other point. It has been found that the making of this average jacket heat uniform from one end of the cylinder to the other greatly increases the efficiency of the jacket and consequently of the engine.

The foregoing describes the essential embodiments of the invention and it is obvious that a plurality of units such as shown may be arranged on a single shaft for increased power where such is desired.

However, in this case the units would be so arranged that the periods during which the pistons are exposed to full boiler pressure, will be equidistantly spaced.

Manifestly, the construction shown is capable of considerable modification and such modification as is considered within the scope and meaning of the appended claims is also considered within the spirit and intent of the invention.

What is claimed is:

1. A steam engine comprising a rotor, a piston attached to said rotor, an annular piston chamber for said piston, supply means for conveying steam into said chamber, said chamber having an opening therein adjacent one side of said supply means for exhausting steam from said chamber, an annular jacket substantially covering one side of said chamber and being interrupted by said supply means to form two opposed ends, one end of said jacket communicating with said opening to receive exhaust steam therefrom, a second annular jacket substantially covering the opposite side of said chamber, means opposite said supply means for interrupting said second jacket to form two opposed ends, said annular jackets communicating with each other at their ends opposite said opening in the piston chamber, and exhaust means communicating with said second jacket adjacent the intake end of the first jacket.

2. A steam engine comprising a rotor, a piston attached to said rotor, an annular piston chamber for said piston, supply means for conveying steam into said chamber, said chamber having an opening therein adjacent one side of said supply means for exhausting steam from said chamber, a pair of annular jackets extending along said chamber in substantially parallel relation to each other, means interrupting said jackets at corresponding points of their respective lengths to provide each with two opposed correspondingly positioned ends, each jacket having an entrance adjacent one end and an exit adjacent the other, the entrance of one jacket communicating with said opening in the piston chamber to receive exhaust steam therefrom, and the entrance to said other jacket coinciding with the exit for the first to receive exhaust steam after it has traveled through the first jacket.

3. A steam engine comprising a rotor, a piston attached to said rotor, an annular piston chamber for said piston, supply means for conveying steam into said chamber, said chamber having an opening therein adjacent one side of said supply means for exhausting steam from said chamber, a jacket communicating with said exhaust opening and extending from said supply means throughout the major portion of the length of said chamber to the other side of said supply means, and a second jacket communicating with the first at its end remote from said exhaust opening and extending therefrom in the opposite direction throughout the major portion of the length of said chamber, said second jacket terminating and having an outlet at a point adjacent the first end of said first jacket.

4. A rotary steam engine comprising a rotor, a piston attached to the periphery thereof, an annular piston chamber, means to open and close the passageway in said chamber at predetermined positions of said piston, a steam inlet to said piston chamber, means to close and open said steam inlet at predetermined positions of said piston, a steam exhaust from said piston chamber, a steam jacket surrounding said piston chamber and divided into interconnected annular sections, and means whereby steam exhausted from said piston chamber is caused to circulate successively in opposite directions through the respective annular sections of said steam jacket.

5. A rotary steam engine including a rotor, a piston attached to the periphery thereof, an annular piston chamber, means to open and close the passageway in said chamber at predetermined positions of said piston, an opening in the wall of said piston chamber on opposite sides of said means, a steam supply means, an exhaust steam jacket surrounding said piston chamber and divided into interconnected annular sections, means movable to selectively connect said supply means to one of said openings and said steam jacket to the other of said openings, whereby the direction of operation of the piston may be reversed, and means whereby steam exhausted from said piston chamber is caused to circulate successively in opposite directions through the respective annular sections of said steam jacket.

RUSSELL P. GLENN.